United States Patent
Kinoshita

[19]

[11] Patent Number: 6,108,920
[45] Date of Patent: Aug. 29, 2000

[54] ELECTRONIC LEVEL

[75] Inventor: Masayuki Kinoshita, Tokyo, Japan

[73] Assignee: Sokkia Co., Ltd., Tokyo, Japan

[21] Appl. No.: 09/017,053

[22] Filed: Jan. 27, 1998

[30]     Foreign Application Priority Data

Feb. 3, 1997  [JP]  Japan ................................. 9-020709
Feb. 3, 1997  [JP]  Japan ................................. 9-020710

[51] Int. Cl.$^7$ ............................................. G01C 15/02
[52] U.S. Cl. ............................................. 33/293; 33/707
[58] Field of Search ................................. 33/293, 707

[56]            References Cited

U.S. PATENT DOCUMENTS 5,777,899  7/1998  Kumagai ................................. 33/293
5,887,354  3/1999  Nagao ................................... 33/707

FOREIGN PATENT DOCUMENTS 5-272970  10/1993  Japan .

*Primary Examiner*—Bernard Roskoski
*Attorney, Agent, or Firm*—Arent Fox Kintner Plotkin & Kahn PLLC

[57]             ABSTRACT

In an electronic level in which a leveling rod is collimated to convert the result of collimation into an image signal in the form of an electric signal and then graduated numerical values are automatically recognized as characters to thereby compute the collimated position, recognition cannot be made with small graduated numerical values when the distance between a telescope 1 and the leveling rod is large. If the graduated numerical values are enlarged, recognition can neither be made when the distance is small because the graduated numerical values go beyond the field of view. As a solution, two kinds of large and small graduated numerical values A, B are indicated on the leveling rod. From the pitches of graduation patterns M1, M2 in the image signals, the distance between the telescope and the leveling rod is obtained. Then, depending on the distance, the graduated numerical value to be recognized is selected out of the graduated numerical values A, B.

5 Claims, 5 Drawing Sheets

ELECTRONIC LEVEL

BACKGROUND OF THE INVENTION

1. Field of the Invention

The present invention relates to an electronic level which automatically identifies or discriminates graduated numerical values marked on a collimated leveling rod (or staff), whereby a collimated position is obtained.

2. Description of the Related Art

As the above-described type of conventional electronic level, there has hitherto been known the following one in Japanese Published Unexamined Patent Application No. 272970/1993. Namely, the electronic level comprises: a telescope for collimating a leveling rod which has therein a graduation (or scale) pattern arranged at a predetermined pitch in a vertical (or longitudinal) direction of the leveling rod and also which has therein graduated numerical values of a single kind of size, the graduated numerical values being disposed corresponding to the graduation pattern; and a two-dimensional sensor for converting that image of the leveling rod which is collimated by the telescope to an image signal. The image signal is compared with an image data which are stored in advance to thereby discriminate or identify the graduated numerical values. The collimated position on the leveling rod is thus automatically computed.

In the above-described conventional electronic level, unless the following are attained, the measurement cannot be made. Namely, in order to specify or locate the positions of the graduation patterns and of the graduated numerical values in the image signals, a reference position must be set somewhere in the widthwise (or lateral) direction of the leveling rod. The collimation must then be made such that the reference position lies correctly in the center of field of view. Therefore, there are disadvantages in that much time is required for the collimation of the leveling rod and that the measurement results will become unstable due to interference or disturbance such as vibrations or the like.

In addition, in the above-described conventional electronic level, there are indicated graduated numerical values of only one kind of size. Therefore, if the distance between the telescope and the leveling rod becomes large, the graduated numerical value in the image signal becomes too small to be discriminated. On the other hand, if the graduated numerical values to be indicated on the leveling rod are made larger, there will be no problem in case the distance between the telescope and the leveling rod is large. However, in case the distance between the telescope and the leveling rod is small, the graduated numerical values will lie out of the field of scope, with the result that the graduated numerical values cannot be discriminated.

SUMMARY OF THE INVENTION

In view of the above-described problems, the present invention has an object of providing an electronic level which is able to discriminate the graduated numerical values irrespective of the distance between the telescope and the leveling rod.

In order to attain the above and other objects, the present invention is an electronic level comprising: a telescope for collimating a leveling rod, the leveling rod having graduation patterns arranged in a vertical direction of the leveling rod at a predetermined pitch and graduated numerical values arranged to correspond to the graduation patterns; a two-dimensional sensor for transforming those images of the leveling rod which are collimated by the telescope into image signals; wherein the image signals and image data which are stored in advance are compared with each other to discriminate the graduated numerical values, whereby the collimation position on the leveling rod is automatically computed. The invention is characterized in: that the graduation patterns are specified from the image signals; and that the graduated numerical values in the image signals are discriminated based on the position of the graduation patterns.

According to the present invention, when the image signals are viewed in the direction in which the graduation patterns are arranged, the following is noted. Namely, the signals that correspond to the graduation patterns lie at a predetermined frequency, but the signals that correspond to the region in which the graduated numerical values are indicated as well as the signals that correspond to the remaining portion are low in periodicity. Based on these characteristics, the signals that correspond to the graduation patterns can be discriminated from the signals that correspond to the remaining portions to thereby specify or identify them. Once the signals that correspond to the graduation patterns can thus be specified, the signals that correspond to the graduated numerical values can be discriminated based on the signals that correspond to the graduation patterns.

As the concrete means for specifying the signals that correspond to the graduation patterns, it is considered to subject the image signals to Fourier transform in the direction in which the graduation patterns are arranged. The periodic function can be represented by Fourier series expansion as a set of sinusoidal waves of an integral multiple of a fundamental frequency. The frequency spectrum thus becomes a discontinuous spectrum, and a maximum value of the spectrum frequency becomes high. On the other hand, the spectrum of an aperiodic function will become a continuous spectrum, and the maximum value of the frequency of the spectrum becomes low. Therefore, based on the maximum value of the frequency, among the frequency spectra, the signals that correspond to the graduation patterns can be identified or specified from the signals that correspond to the remaining portion.

According to another aspect of the present invention, there is provided an electronic level comprising: a telescope for collimating a leveling rod, the leveling rod having graduation patterns arranged in a vertical direction of the leveling rod at a predetermined pitch and graduated numerical values arranged to correspond to the graduation patterns; a two-dimensional sensor for transforming those images of the leveling rod which are collimated by the telescope into image signals; wherein the image signals and image data which are stored in advance are compared with each other to recognize the graduated numerical values, whereby the collimation position on the leveling rod is automatically computed. The invention is characterized in: that the leveling rod has indicated thereon plural kinds of graduated numerical values which are different from each other in size; that a distance between the telescope and the leveling rod is computed from the magnitude of pitches of the graduation patterns in the image signals; and that a determination is made as to which size of the graduated numerical values is recognized depending on the distance.

According to the present invention, the graduation patterns are indicated at a predetermined constant pitch. Therefore, when the distance between the telescope and the leveling rod becomes large, the pitch of the graduation patterns in the image signals becomes small. On the other hand, when the distance between the telescope and the leveling rod becomes short, the pitch of the graduation patterns in the image signals becomes large. Then, if an arrangement is made such that the graduated numerical value of a most appropriate size, among the graduated numerical values of different sizes, is recognized or discriminated depending on the distance between the telescope and the leveling rod, the graduated numerical values can be recognized irrespective of whether the distance between the telescope and the leveling rod is small or large.

As a concrete means for obtaining the pitches of the graduation patterns, the image signals are preferably subjected to Fourier transform in the direction in which the graduation patterns are arranged. The periodic function can be represented by Fourier series expansion as a set of sinusoidal waves of an integral multiple of a fundamental frequency. The frequency spectrum thus becomes a discontinuous spectrum, and a maximum value of the spectrum frequency becomes high. In other words, when the pitch of the graduation pattern in the image signal becomes small, the maximum value of the frequency of the spectrum becomes high. On the other hand, when the pitch of the graduation pattern in the image signal becomes large, the maximum value of the frequency of the spectrum becomes low. Therefore, the distance between the telescope and the leveling rod can be obtained from the maximum value of the frequency.

On the other hand, the small graduated numerical values do not go beyond the field of view irrespective of whether the distance between the telescope and the leveling rod is small or large. Therefore, preferably, the smaller graduated numerical values are recognized with priority. In case the recognition of the smaller graduated numerical values is impossible due to too small a graduated numerical value in the image signal, a determination is made that the distance between the telescope and the leveling rod is too large. An object of recognition is then sequentially changed to larger graduated numerical values.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
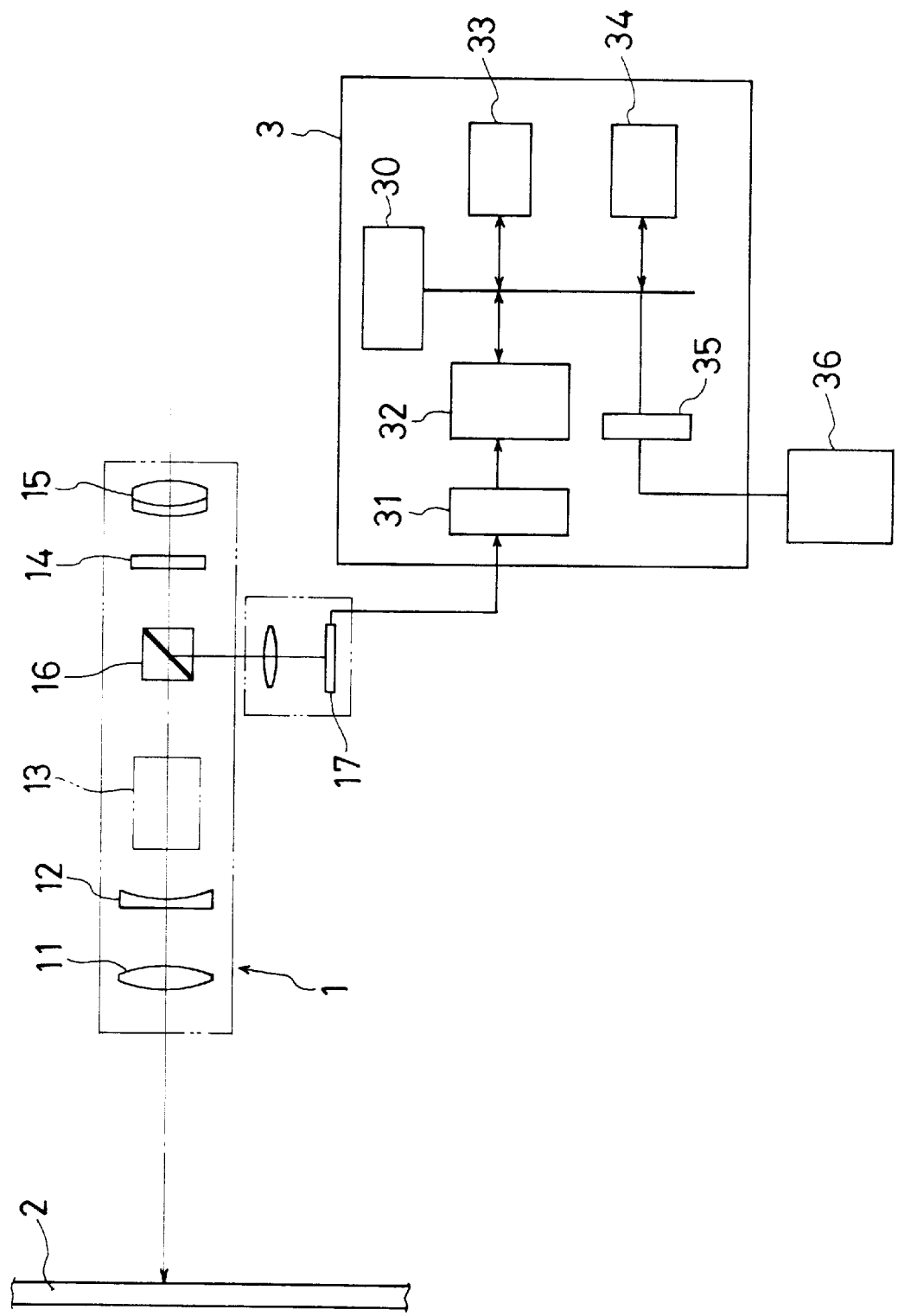
FIG. 1 is a block diagram showing the arrangement of one embodiment of the present invention.

With reference to FIG. 1, reference numeral 1 denotes a telescope for collimating a leveling rod 2 which is disposed vertically at a survey point which lies in front of the telescope 1. The telescope 1 converts the image of the leveling rod 2 into an image signal which is an electrical signal, and outputs it in an operating portion or operating module 3. An electronic level of the present invention is made up of the telescope 1 and the operating portion 3. Inside the telescope 1, there are disposed the following elements in the order mentioned from the front end, i.e., an objective lean 11, a focusing lens 12, a compensator 13, a focusing plate 14, and an eyepiece 15. Even if the telescope 1 is slightly inclined back and forth (i.e., relative to a horizontal line), the compensator 13 functions to compensate for the inclination so that the leveling rod 2 can be collimated. Though not illustrated, the focusing lens 12 has thereon a cross collimation line. In addition, the telescope 1 has disposed therein a beam splitter 16 between the compensator 13 and the focusing plate 14. It is thus so arranged that the image of the leveling rod 2 can be split into a charged-couple device (CCD) camera 17 which serves as a two-dimensional sensor which is disposed sidewise relative to an optical axis of the telescope 1. The CCD camera 17 converts the image of the collimated leveling rod 2 into an image signal which is an electric signal, and outputs it to the operating portion 3. The image signal from the CCD camera 17 is digitized by an analog/digital (A/D) converter 31 and is stored in an image memory 32. In the operating portion 3, aside from the above-described image memory 32, a read-only memory (ROM) 33 and a random-access memory (RAM) 34 are connected via a bus line to a central processing unit (CPU) 30 which performs an operating processing. In addition, the operating results in the operating system 3 and the image of the leveling rod 2 are displayed on a liquid crystal display 36 via a driver circuit 35. As the two-dimensional sensor, a metal oxide silicon field-effect transistor (MOSFET) may also be used instead of the CCD camera.

Figure 2:
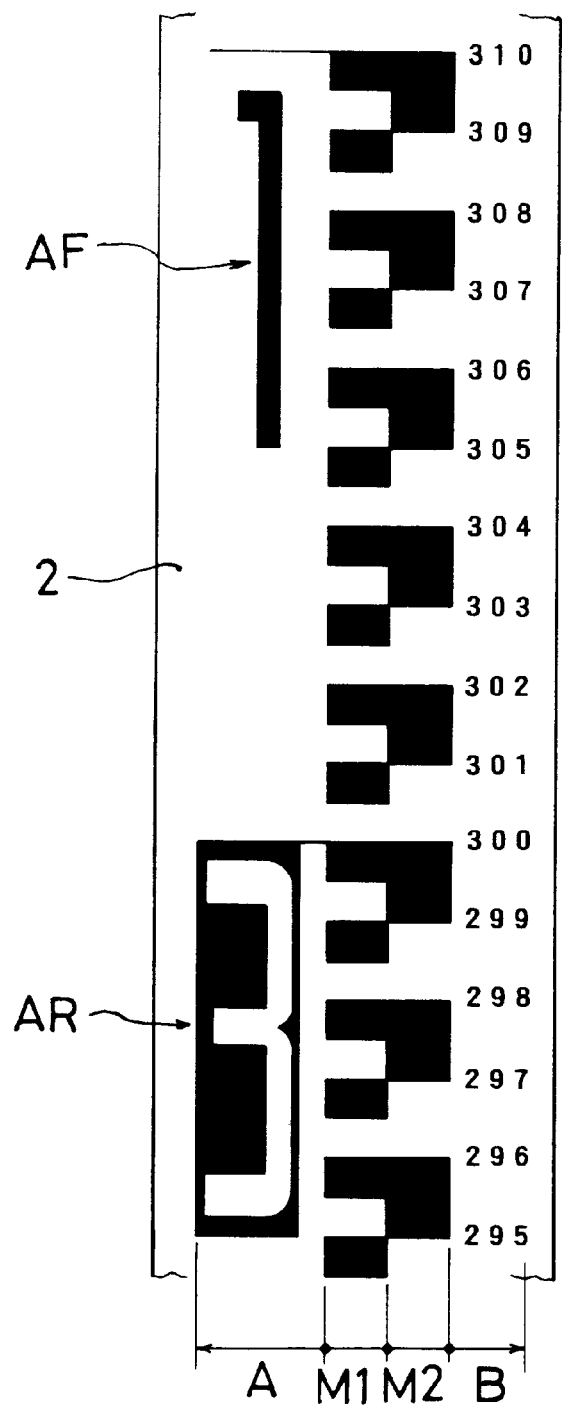
FIG. 2 is a diagram showing one example of indication on a levelling rod.
Figure 3:
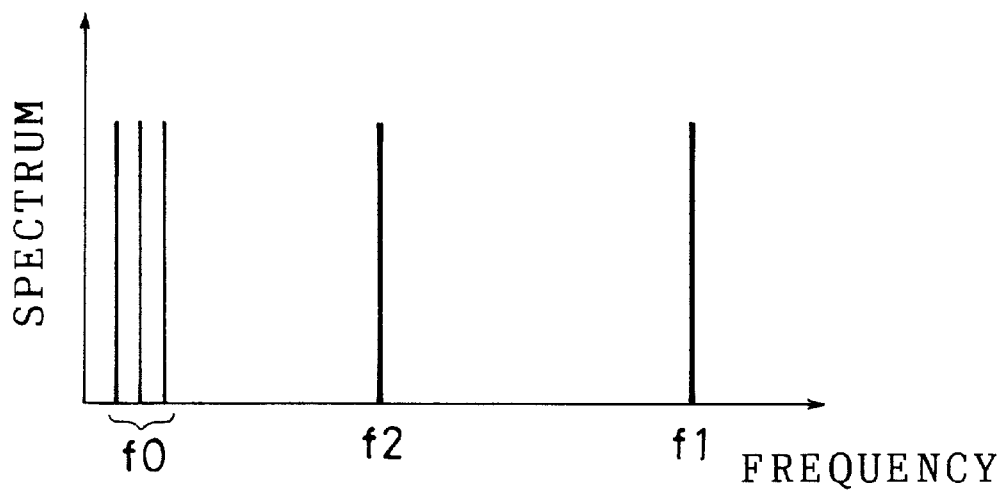
FIG. 3 is a graph showing an example of maximum frequencies obtained by Fourier transform.
Figure 4:
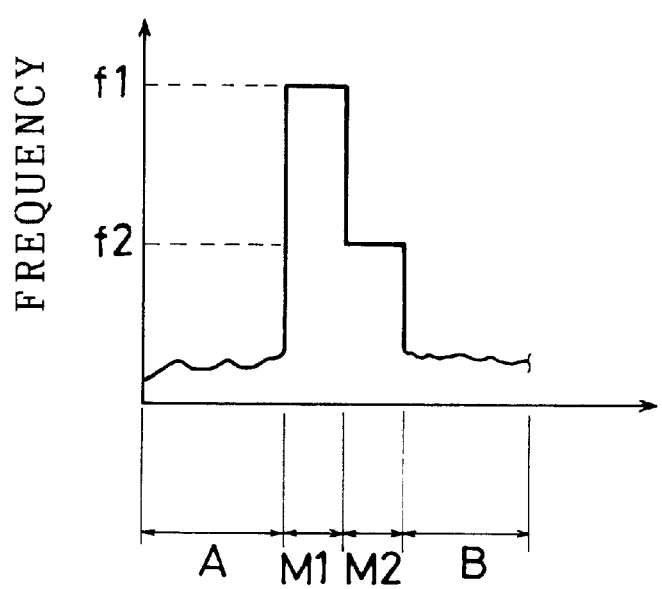
FIG. 4 is a graph showing the change in maximum frequencies over the entire lateral width of the levelling rod.

As shown in FIG. 2, the leveling rod 2 has on its surface an indication or a marking of graduation patterns M1, M2 which are disposed adjacent to each other. Graduation in each of the graduation patterns M1, M2 is made in the vertical or longitudinal direction of the leveling rod at a predetermined pitch at an equal distance from each other. In the present embodiment, the pitch of graduation of the graduation pattern M1 is set to one half of the pitch of the graduation pattern M2. In addition, on the right side of the graduation patterns M1, M2, there are indicated or marked 3-digit graduated numerical values B. These graduated numerical values B are 4 mm in size in the longitudinal direction (i.e., in height) and are indicated in every 10 mm. For example, the indication of 300 means that it is located at 300 cm from the bottom end of the leveling rod 2. On the left side of the graduation patterns M1, M2, there are indicated graduated numerical values A which are larger than the graduated numerical values B. The graduated numerical values A are 4 cm in size in the longitudinal direction (i.e, in height) and are indicated therein graduated numerical values AF which are black in color and show the order of every 10 cm and graduated numerical values AR which are white in color contrasted in black background and show the order of every 1 m. In other words, the white graduated numerical value AR of "3" contrasted in black background shows a position of 3 m, and the black graduated numerical value AF of "1" marked above "3" shows a position of 3 m and 10 cm. This kind of image of the leveling rod 2 is stored in the image memory 32 as a digitized image signal. The CPU 30 performs Fourier transform of the image signal, according to a computation program in the ROM 33, along the vertical direction which is the direction in which the graduation patterns M1, M2 are arranged. When a periodic function is subjected to Fourier transform, a spectrum of high frequency can be obtained. From an aperiodic function, on the other hand, only a spectrum of low frequency can be obtained. Therefore, when Fourier transform is performed with respect to the portion of highly periodic graduation pattern M1, a spectrum of high frequency f1 can be obtained as shown in FIG. 3. When Fourier transform is performed with respect to the graduation pattern M2, a spectrum of a frequency f2 which is ½ of the frequency f1 can be obtained because the pitch of M2 is two times that of M1. The portions in which the graduated numerical values A, B are marked are low in periodicity and, therefore, only a spectrum of low frequency group f0 can be obtained. If this Fourier transform is continuously performed from the left side to the right side with respect to the image signals of the leveling rod 2, the maximum value of the frequencies of the spectra that can be obtained by Fourier transform is as shown in FIG. 4. As can be seen from FIG. 4, by repeating Fourier transform over the entire width of the leveling rod 2, the positions of the graduation patterns M1, M2 can be obtained. Once the positions of the graduation patterns M1, M2 have thus been obtained, a comparison is made, based on the positions, between the image signal of one of the graduated numerical values A and B and the value pattern data which are stored in the RAM 33, whereby the graduated numerical values are recognized or identified in the form of characters. When the distance between the telescope and the leveling rod 2 is large, the pitch of the image signals corresponding to the graduation patterns M1, M2 become finer, with the result that the frequencies f1, f2 both become high. When the distance between the telescope 1 and the leveling rod 2 is short, on the other hand, the frequencies f1, f2 become low. Therefore, the distance between the telescope 1 and the leveling rod 2 is obtained from the frequencies f1, f2. In other words, once the frequency f1 is known, the pitch in the image signal of the graduation pattern M1 can be obtained, and the distance to the leveling rod 2 can be obtained from the pitch by means of a stadia system. The distance between the telescope 1 and the leveling rod 2 can also be obtained with respect to the frequency f2 in a similar manner. An average value of the distances obtained with respect to frequencies f1, f2 is finally made to be the distance between the telescope 1 and the leveling rod 2. If the distance is longer than a predetermined distance that has been set in advance, the graduated numerical value A is recognized. If the distance is shorter than the predetermined distance, the graduated numerical value B is recognized. In this manner, the accuracy of character recognition can be improved.

Figure 5:
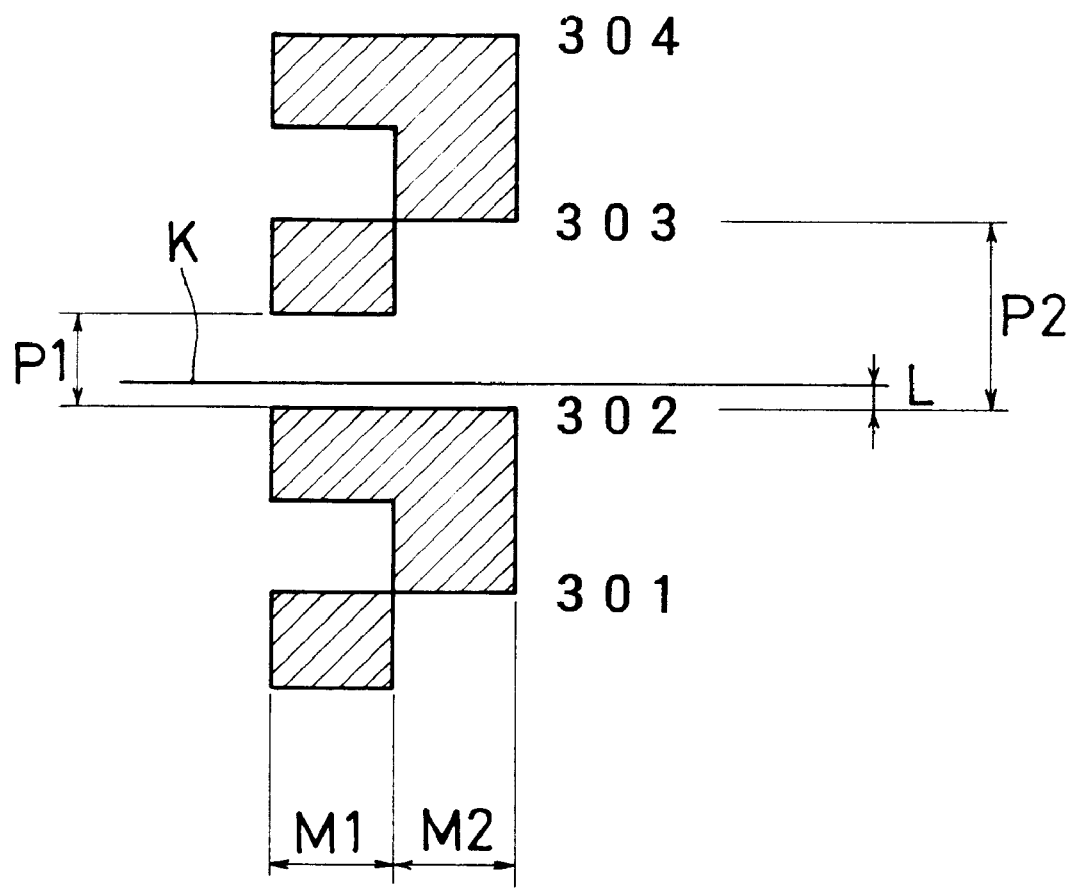
FIG. 5 is a schematic view to explain the method of interpolating a collimation position.

As shown in FIG. 5, the collimation position that must finally be obtained is the position of a horizontal collimation line K. Therefore, when the graduation pattern M1 is used, the pitch P1(e.g., 5 mm) on the leveling rod 2 is interpolated and, when the graduation pattern M2 is used, the pitch P2(e.g., 10 mm) on the leveling rod 2 is interpolated, whereby the dimension L is obtained. Suppose that the dimension L is 2.5 mm, then 2.5 mm is added to 302 cm that has been recognized by an automatic reading of the graduated numerical value B, whereby 302.25 cm is obtained as the collimation position of the collimation line K.

Figure 6:
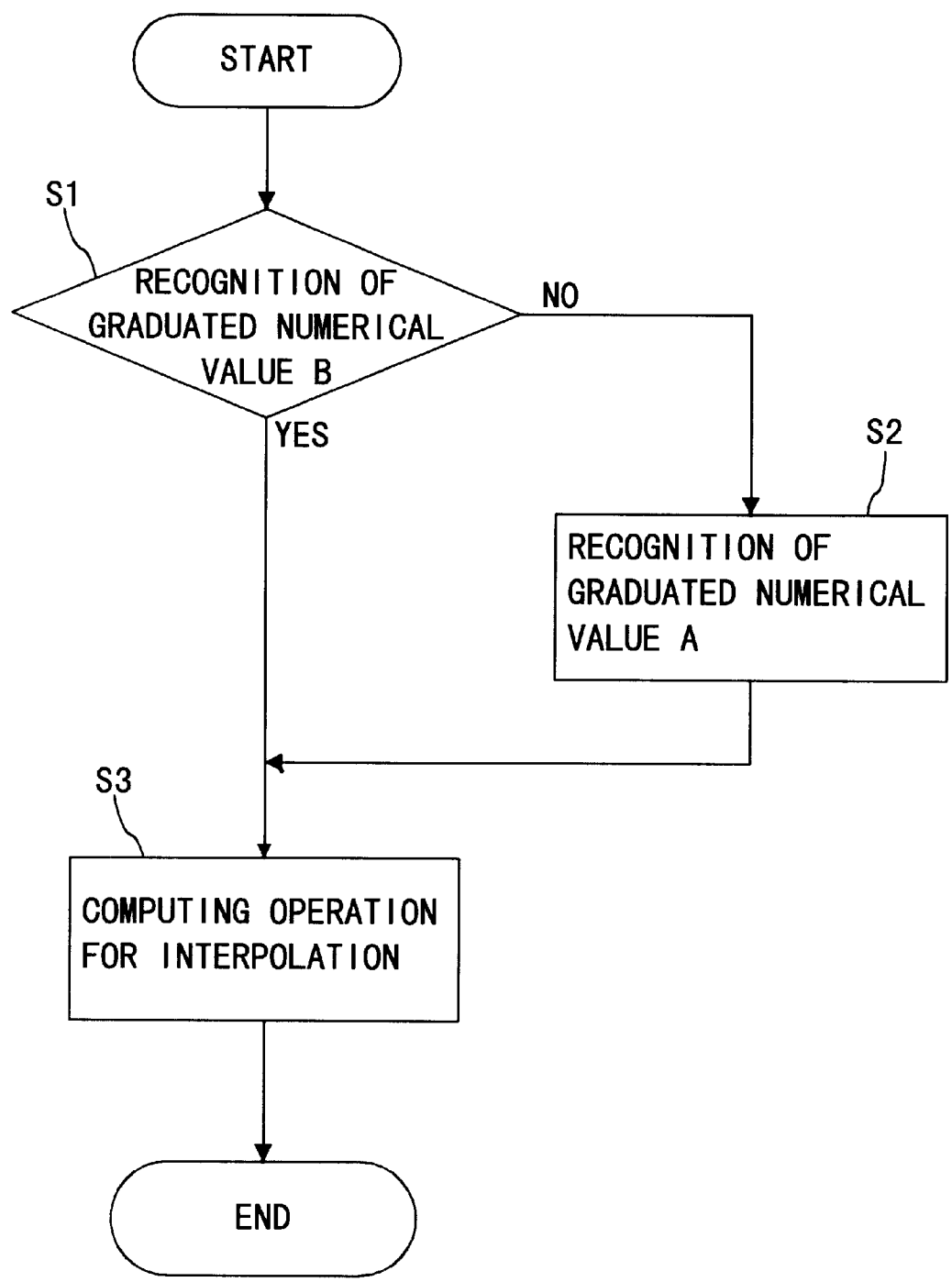
FIG. 6 is a flow diagram showing the processing in another embodiment of the present invention.

Aside from the above-described embodiment, the following embodiment is also possible. Namely, as shown in FIG. 6, instead of obtaining the distance between the telescope and the leveling rod 2, the smaller graduated numerical value B is recognized with priority (S1). Once it has been recognized, the computing operation for interpolation as explained hereinabove with reference to FIG. 5 is performed (S3), whereby the height of collimation position is obtained. When the graduated numerical value B cannot be recognized because the distance between the telescope and the leveling rod 2 is too large, the object of recognition is switched to the graduated numerical value A, to thereby recognize the graduated numerical value A (S2). Thereafter, the computing operation for interpolation is also performed (S3).

It is readily apparent that the above-described electronic level meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An electronic level comprising:
   a telescope for collimating a leveling rod, said leveling rod having graduation patterns arranged in a vertical direction of said leveling rod at a predetermined pitch and graduated numerical values arranged to correspond to the graduation patterns;
   a two-dimensional sensor for transforming those images of the leveling rod which are collimated by the telescope into image signals;
   wherein said image signals and image data which are stored in advance are compared with each other to discriminate the graduated numerical values, whereby the collimation position on the leveling rod is automatically computed,
   characterized in:
      that said graduation patterns are specified from said image signals; and
      that said graduated numerical values in said image signals are discriminated based on the position of said graduation patterns.

2. A leveling rod according to claim 1, wherein said graduation patterns are specified from spectrum frequencies which are obtained by Fourier transform of said image signals in a direction in which said graduation patterns are arranged.

3. An electronic level comprising:
   a telescope for collimating a leveling rod, said leveling rod having graduation patterns arranged in a vertical direction of said leveling rod at a predetermined pitch and graduated numerical values arranged to correspond to the graduation patterns;
   a two-dimensional sensor for transforming those images of the leveling rod which are collimated by the telescope into image signals;
   wherein said image signals and image data which are stored in advance are compared with each other to recognize the graduated numerical values, whereby the collimation position on the leveling rod is automatically computed,
   characterized in:
      that the leveling rod has indicated thereon plural kinds of graduated numerical values which are different from each other in size;
      that a distance between the telescope and the leveling rod is computed from the magnitude of pitches of the graduation patterns in the image signals; and
      that a determination is made as to which size of the graduated numerical values is recognized depending on the distance.

4. An electronic level according to claim 1, wherein the said distance is computed based on a spectrum of frequency which is obtained by Fourier transform of said graduation patterns, said Fourier transform being made in a direction in which said graduation patterns are arranged.

5. An electronic level comprising:
- a telescope for collimating a leveling rod, said leveling rod having graduation patterns arranged in a vertical direction of said leveling rod at a predetermined pitch and graduated numerical values arranged to correspond to the graduation patterns;
- a two-dimensional sensor for transforming those images of the leveling rod which are collimated by the telescope into image signals;
- wherein said image signals and image data which are stored in advance are compared with each other to recognize the graduated numerical values, whereby the collimation position on the leveling rod is automatically computed, characterized in:
- that the leveling rod has indicated thereon plural kinds of graduated numerical values which are different from each other in size;
- that smaller graduated numerical values are recognized with priority; and
- that, in case the recognition of the smaller graduated numerical values is impossible, an object of recognition is sequentially changed to larger graduated numerical values.

* * * * *